United States Patent [19]
Hauser et al.

[11] 3,874,248
[45] Apr. 1, 1975

[54] SHIFT MECHANISM FOR TRANSMISSIONS

[75] Inventors: Hans Hauser; Ronald N. Jones, both of Fredericktown, Ohio

[73] Assignee: The J. B. Foote Foundry Co., Fredericktown, Ohio

[22] Filed: July 18, 1973

[21] Appl. No.: 380,169

[52] U.S. Cl. ................ 74/475, 74/143, 74/473 R, 74/577 M
[51] Int. Cl. .............................................. G05g 9/06
[58] Field of Search ..... 74/473 R, 474, 475, 577 M, 74/142, 143

[56] References Cited
UNITED STATES PATENTS

| | | | |
|---|---|---|---|
| 1,140,167 | 5/1915 | Kolb et al. | 74/577 M X |
| 1,159,505 | 11/1915 | Kusebauch | 74/129 |
| 2,094,163 | 9/1937 | Weber | 74/474 |
| 2,498,914 | 2/1950 | Correll | 74/474 |
| 3,544,748 | 12/1970 | Schwab | 74/577 M |
| 3,665,775 | 5/1972 | Freeman | 74/473 R |

FOREIGN PATENTS OR APPLICATIONS

| | | | |
|---|---|---|---|
| 1,247,258 | 10/1960 | France | 74/475 |
| 331,122 | 10/1935 | Italy | 74/474 |

*Primary Examiner*—Allan D. Herrmann
*Attorney, Agent, or Firm*—Allen D. Gutchess, Jr.

[57] ABSTRACT

Shift mechanism is provided for transmissions, and particularly small transmissions used on riding lawn mowers, garden tractors, and the like. The shift mechanism has a pivotable shift lever which requires the operator to interrupt the motion of the lever when shifting from neutral to reverse and from neutral to each forward speed, the interruption requiring releasing the lever or even reversing it slightly. This enables the operator to know by feel what gear the transmission is in. At the same time, the transmission can quickly be shifted from reverse to neutral or from any forward speed down to or toward neutral without interruption. The shift mechanism includes the movable shift lever, a carrier engaged by the shift lever and having a predetermined path of movement, a pawl member pivotally carried by the carrier, and a stop member engageable by the pawl member to control the movement of the carrier, the pawl member, and the lever.

30 Claims, 15 Drawing Figures

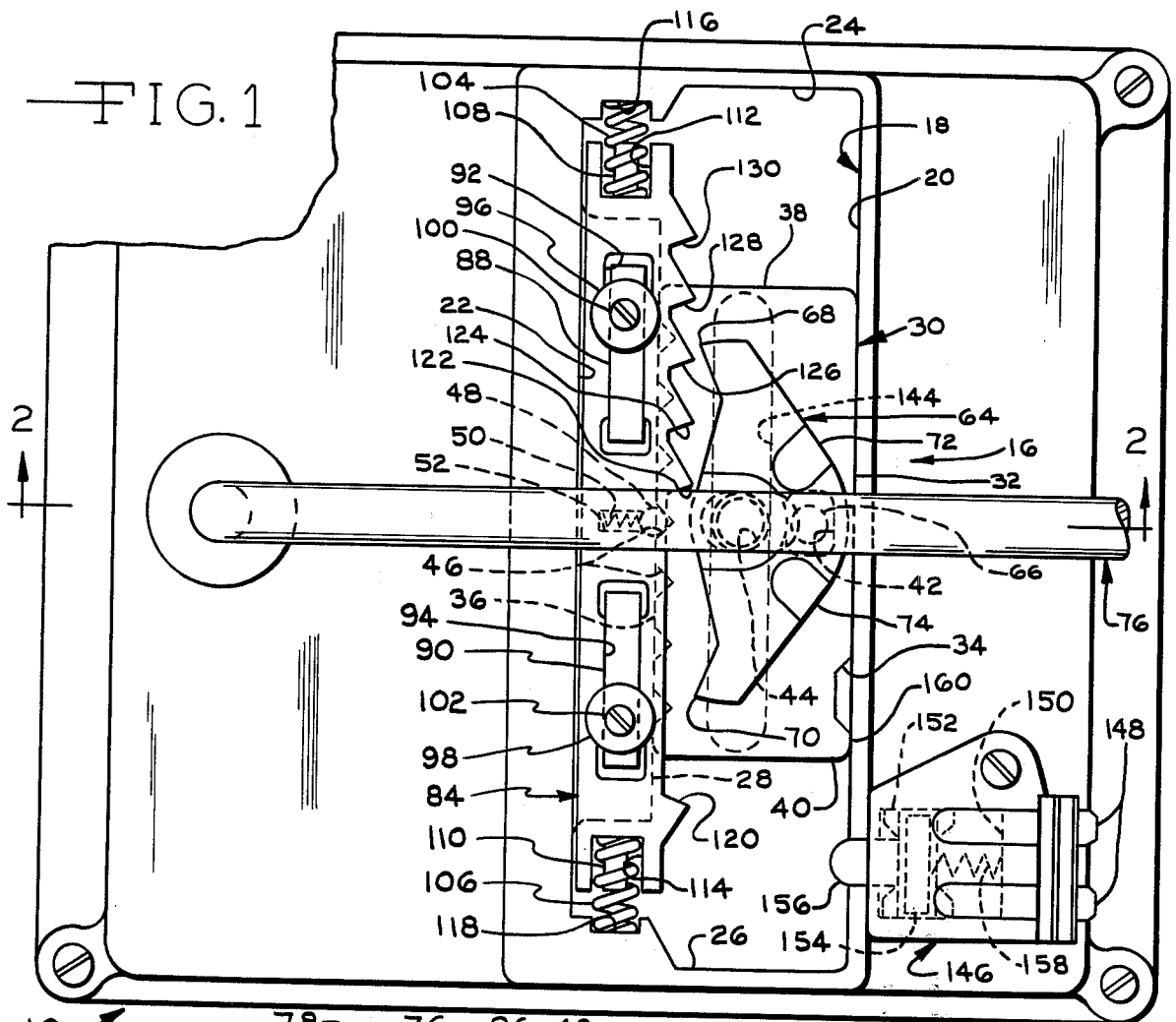

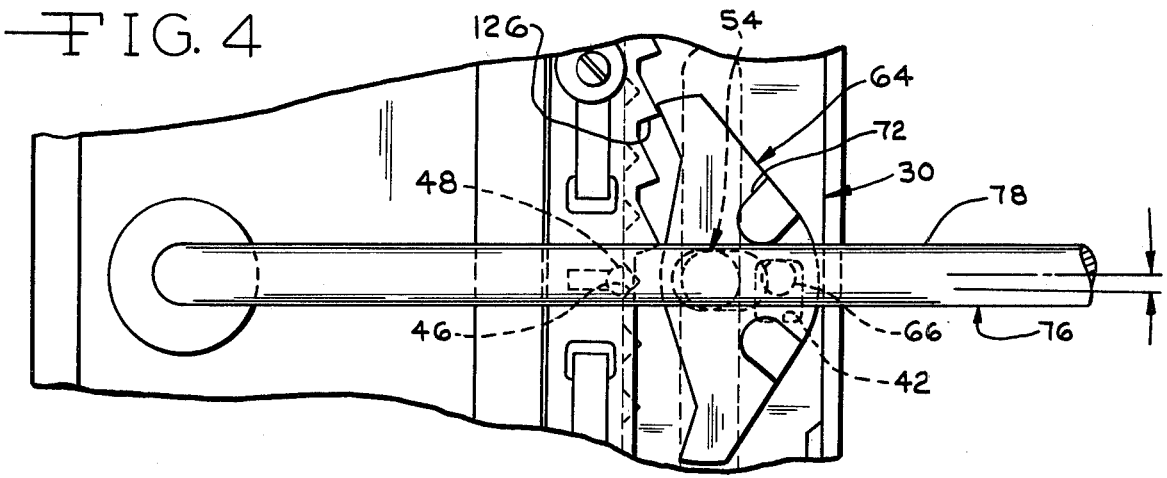
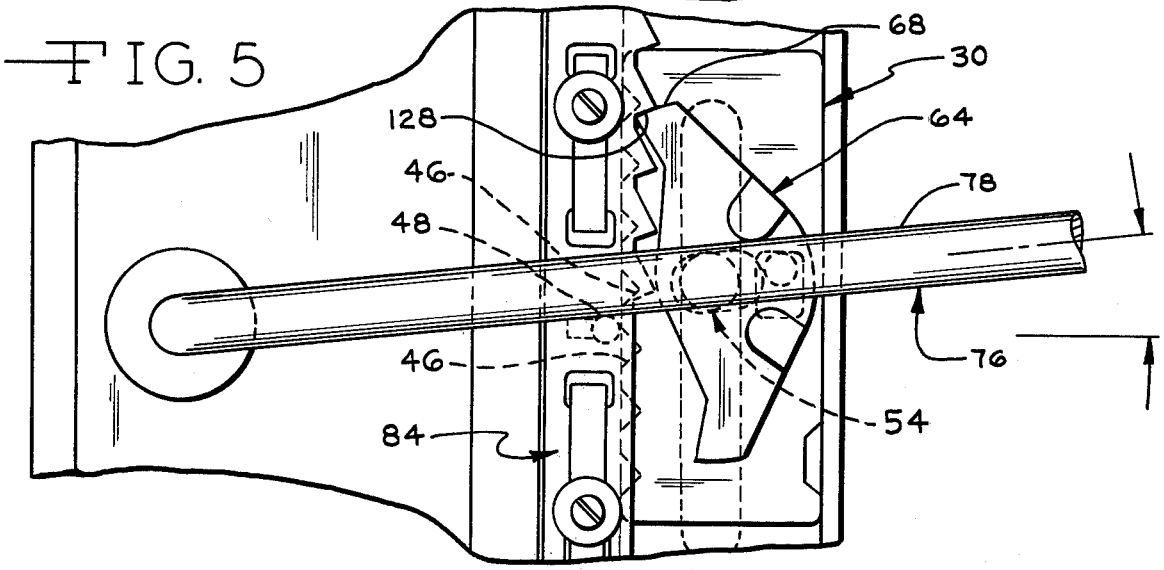
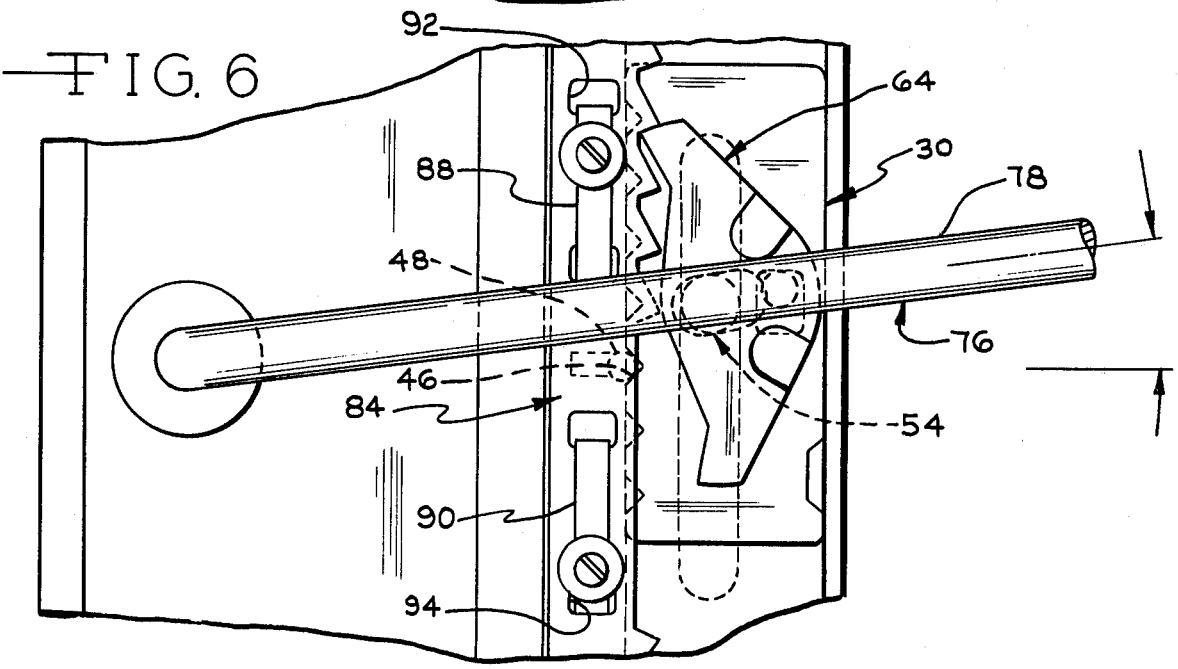

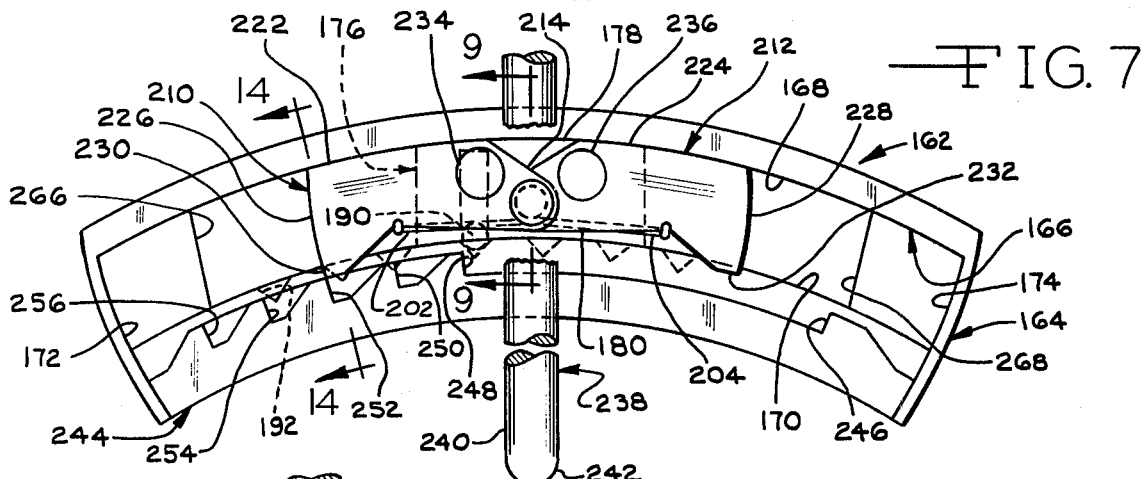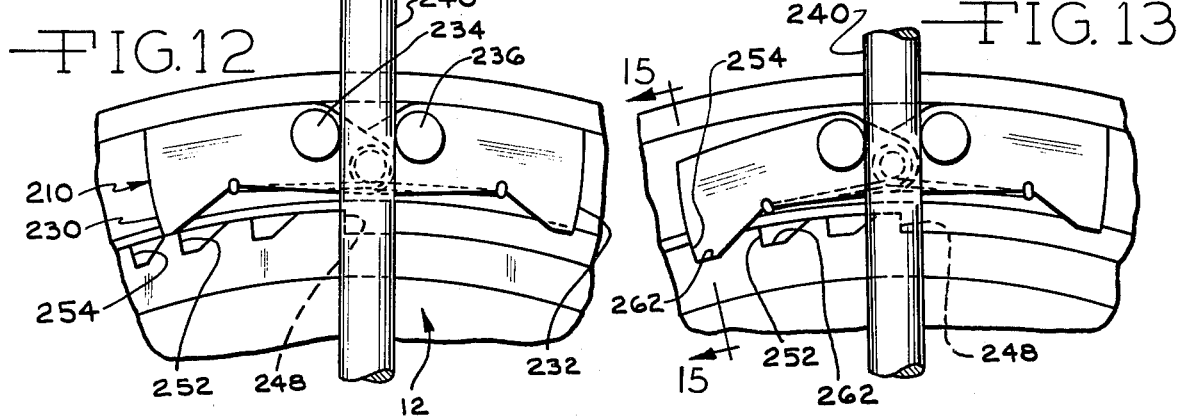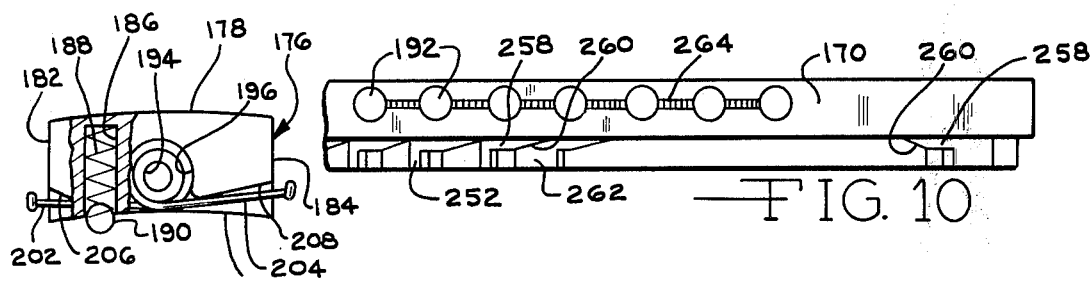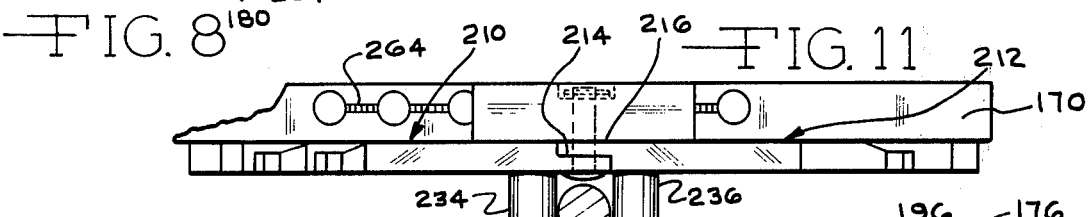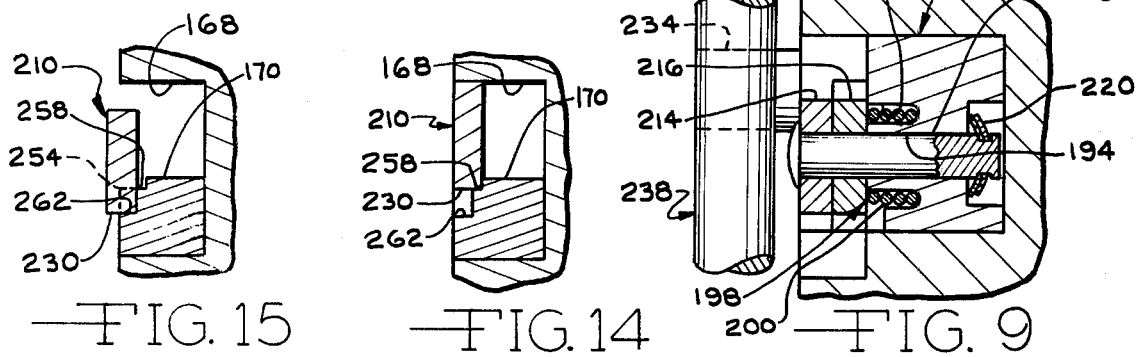

SHIFT MECHANISM FOR TRANSMISSIONS

This invention relates to shift mechanism for a transmission and particularly a small transmission as used on smaller vehicles, such as riding lawn mowers and garden tractors.

Heretofore, shift patterns employed with transmissions were often of such shape that the operator knew by the position of the shift lever what gear the transmission was in, such patterns being the well known H-shaped pattern and E-shaped pattern and variations thereof, by way of example. Even with shift mechanisms having shift levers movable in a lineal or arcuate path, effort on the part of the operator was required to shift through each set of gears to overcome the resistance of the gears as they became enmeshed, so that this again enabled the operator to at least have a good idea of the gear the transmission was in. However, with transmission in which shifting of the gears can occur with little or no effort, it is easy for an operator to manipulate the lever through sets of gears without being aware of the position of the transmission, particularly where the transmission has a plurality of forward speed gears, e.g., four or five.

The new shift mechanism in accordance with the invention requires uniform manipulation of a shift lever in order to shift the transmission from neutral to reverse and from neutral up through the forward speeds. The shift mechanism requires the operator to interrupt the movement of the shift lever, by either releasing the shift lever temporarily or actually reversing it slightly, in order to shift to the next set of gears. The manipulation required is uniform so that shifting can be accomplished quickly and with minimal skill and yet the operator knowns by feel what gear the transmission is in. Further, the shift lever can be manipulated quickly without interruption when shifting the transmission from reverse to neutral and from any forward speed down to or toward neutral.

The shift mechanism includes a movable shift lever which engages a pawl member which, in turn, is pivotally mounted on a carrier. The carrier is guided along a predetermined path, preferably on top of the transmission housing. A stop member is located along the path of the carrier and is engaged by the pawl member to limit the extent of movement of the carrier, the pawl member, and the shift lever.

It is, therefore, a principal object of the invention to provide a shift mechanism for a transmission which requires an interruption of motion on behalf of the operator when shifting from neutral to reverse or to forward speeds.

Another object of the invention is to provide a shift mechanism for a transmission which enables an operator to known by feel what gear position the transmission is in.

A further object of the invention is to provide a shift mechanism for a transmission which requires a uniform interrupted motion to shift from neutral to reverse or up to any forward speed position and yet enable shifting back toward neutral with a continuous motion.

Other objects and advantages of the invention will be apparent from the following detailed description of preferred embodiments thereof, reference being made to the accompanying drawings, in which:

FIG. 1 is a fragmentary plan view of a transmission embodying shift mechanism according to the invention;

FIG. 2 is a view in longitudinal cross section taken along the line 2—2 of FIG. 1;

FIG. 3 is a view in transverse cross section taken along the line 3—3 of FIG. 2;

FIGS. 4–6 are fragmentary, plan views showing the shift mechanism in three progressive shifting positions;

FIG. 7 is a fragmentary plan view of modified shift mechanism according to the invention;

FIG. 8 is a detailed plan view of a component of the shift mechanism of FIG. 7;

FIG. 9 is a view in transverse cross section taken along the line 9—9 of FIG. 7;

FIG. 10 is a front view in elevation of a stop member of the shift mechanism of FIG. 7;

FIG. 11 is a view similar to FIG. 10 but with the other components of FIG. 7 in operating position;

FIGS. 12 and 13 are fragmentary, plan views showing the shift mechanism in two additional shifting positions; and FIGS. 14 and 15 are enlarged, fragmentary views in transverse cross section taken along the lines 14—14 and 15—15 of FIGS. 7 and 13, respectively.

Referring to FIG. 1, a transmission embodying the invention is indicated at 10 and has a number of forward speeds as well as reverse, five forward speeds being possible with the particular transmission as shown. The transmission can be of the type shown in the U.S. application of Hauser et al, filed on May 21, 1973 and bearing Ser. No. 362,116. The transmission 10 includes an upper housing 12 and a lower housing 14 with shift mechanism 16 being mounted on top of the upper housing 12. The upper housing 12 forms a recess or track 18 of elongate, rectangular configuration and including a forward guide wall 20, a rear wall 22, end walls 24 and 26, and an intermediate shorter guide wall 28 which is parallel to the forward guide wall 20.

The shift mechanism includes a carrier or block 30 which is positioned between the guide walls 20 and 28 and is lineally movable in the recess 18. The carrier 30 has a forward longitudinal edge 32 positioned adjacent the forward guide wall 20 with a notch 34 toward one end thereof, the purpose of which will be subsequently discussed. The carrier also has a rear longitudinal edge 36 lying adjacent the intermediate wall 28 with the walls 20 and 28 and the edges 32 and 36 cooperating to guide the carrier 30 in a predetermined path. The carrier 30 has squared end edges 38 and 40 which engage the recess end walls 24 and 26 to limit movement of the carrier 30 along its path. A central rectangular opening 42 and a central round hole or bore 44 are also formed in the carrier 30. A plurality of recesses or notches 46 are formed in the longitudinal edge 36, there being one of the recesses 46 for each of the positions of the transmission. In this instance there are seven of the recesses 46 corresponding to the seven positions of the transmission, namely reverse, neutral, and five forward speeds.

A ball or projection 48 is urged outwardly into one of the recesses 46 by a spring 50 located in a bore 52 in the upper housing 12 and opening at the intermediate wall 28 of the recess 18. The ball 48 projects partly into any one of the seven recesses 46 to hold the carrier 30 in the appropriate one of its seven positions located along the lineal path.

A pin 54 extends through the central circular hole 44 in the carrier 30 and through a bushing 56 located thereabove. The pin 54 has a head 58 above the bushing and a lower enlarged portion 60 forming a shoulder 62 to hold the pin in position with respect to the carrier 30 anad the bushing 56.

Pawl means in the form of a pawl 64 is pivotally mounted on the carrier 30 by the pin 54 and the bushing 56 and moves with the carrier 30 in its path in the recess 18. The extent of pivotal movement of the pawl 64 relative to the carrier 30 is limited by a projection 66 which extends from the pawl 64 downwardly into the central rectangular opening 42. The pawl 64 can be pivoted relative to the carrier 30 until the projection 66 engages either opposite edge of the opening 42, at which time further movement of the pawl will cause longitudinal movement of the carrier 30. Two end dogs or projections 68 and 70 of the pawl pivot about the pin 54 to move toward and away from the longitudinal edge 36 of the carrier 30. The pawl 64 further has two upwardly extending projections 72 and 74 which are disposed symmetrically about a center line extending through the pin 54 and the projection 66.

A shift lever 76 extends between the projections 72 and 74 with the closest spacing between the projections preferably being slightly greater than the maximum transverse dimension of the shift lever 76. As shown, the lever 76 has a horizontally extending portion 78 and a downwardly extending end 80 which is pivotally received in a bore 82 formed in the upper housing 12. The other end of the shift lever 76 can terminate forwardly of the transmission in a suitable handle which can be manipulated by the vehicle operator.

A stop member 84 is slidably mounted on a horizontal surface 86 located between the two walls 22 and 28 in the recess 18 to limit movement of the shift lever 74. Two rectangular projections 88 and 90 extend upwardly from the surface 86 through two generally rectangular openings 92 and 94 in the stop member 84. Retaining plates or washers 96 and 98 are located on top of the projections 88 and 90 and are held by suitable fasteners or screws 100 and 102. The cooperation of the rectangular openings 92 and 94 and the rectangular projections 88 and 90 guides the stop member 84 in longitudinal movement parallel to the guide walls 20 and 22. The movement of the stop member 84 is limited in both directions by the distance between the ends of the projections 88 and 90 and dthe corresponding ends of the openings 92 and 94. The stop member 84 is urged toward a central position with the rectangular projections 88 and 90 projecting substantially symmetrically through the rectangular openings 92 and 94 by virtue of springs 104 and 106 located on pins 108 and 110 and end recesses 112 and 114 in the stop member 84. The springs also are seated in recesses 116 and 118 in the upper housing 12.

A forward edge of the stop member 84 facing toward the pawl 64 has a plurality of engageable teeth thereon. These include oppositely facing teeth 120 and 122 which correspond to the neutral position of the transmission, as will be subsequently discussed. Four additional teeth 124–130 facing in the same direction as the tooth 122 correspond to the first, second, third, and fourth forward speed positions of the transmission. There is no tooth needed for reverse or the fifth forward speed as will be subsequently apparent.

Shifting means indicated at 132 is located within the housings 12 and 14 below the shift mechanism 16. The shifting means includes a shifter fork 134 which is engageable with a shift collar or other suitable means in the transmission for shifting gears when the shift fork 134 is pivoted about axles 136 suitably rotatable mounted within the housings and, in this instance, in alignment with the downwardly extending end 80 of the shift lever 76. The upper axle 136 and a forward projection 138 of the fork 134 extend through a shift arm 140, the outer end of which has a slot 142 extending longitudinally thereof which receives the lower enlarged portion 60 of the pin 54. When the pin 54 moves lineally along with the carrier 30, extending through a housing slot 144, it pivots the arm 140 and the shifter fork 134 to cause the shifting in the transmission.

With the various components nof the shift mechanism 16 being described, the operation thereof will be set forth, with reference to FIGS. 1, 4, 5, and 6. With the shift lever 76 in the central position, as shown in FIG. 1, and with the ball 48 in the fourth or center notch 46, the transmission is in the second forward speed. If the operator now desires to shift to the third forward speed, he moves the lever 76 in a counterclockwise direction, as viewed from above. As the lever 76 is moved, the horizontally extending portion 78 thereof first contacts the projection 72 of the pawl 64, with further movement of the lever causing the pawl to pivot about the pin 54, the carrier 30 remaining stationary because of the ball 48 extending into the notch 46. The pivotal movement of the pawl 64 continues until the projection 66 engages the side of the rectangular opening 42. Approximately in this position, the dog 68 has moved on top of the tooth 126 (FIG. 4). In this position, further movement of the shift lever 76 will cause the carrier 30 to also move, forcing the ball 48 out of the notch 46. The dog 68 then engages the next tooth 128, as shown in FIG. 5, with the ball 48 being between the first notch 46 and the next notch 46. In this position, further movement of the lever 76 moves all three of the pawl 64, the carrier 30, and the stop member 84. This movement continues until the ends of the rectangular projections 88 and 90 engage the ends of the elongate openings 92 and 94 (FIG. 6), at which time the shift mechanism elements and the lever 76 can be moved no further. At this time, the ball 48 has moved into the next notch 46, with the pin 54 moved a similar distance. This movement of the pin 54 causes the shift arm 140 to pivot the shifter fork 134 sufficiently to cause the gears to engage in the third forward speed position.

In order to shift into the fourth forward speed, the shift lever 76 must be interrupted in its motion and actually reversed slightly. This reverse movement causes the horizontally extending portion 78 of the shift lever 76 to engage the other projection 74 on the pawl and cause the pawl to pivot in the opposite or clockwise direction to move the dog 68 out of engagement with the tooth 128. Such movement of the shift lever 76 need only be slight. With the dog 68 out of engagement with the tooth 128, the springs 104 and 106 cause the stop member 84 to move back to its central position with the tooth 128 moving back beyond the dog 68. Subsequent pivotal movement of the pawl 64 in the counterclockwise direction will cause the dog 68 to move on top of the tooth 128 and subsequently against the next tooth 130, which will cause the transmission to shift to the fourth forward speed by the time the stop member 84 reaches its limit of movement in the same direction again.

When the transmission is in the fourth speed position and it is desired to shift into the fifth forward speed, counterclockwise movement of the shift lever 76 moves the dog 68 of the pawl 64 onto the top of the tooth 130 with further movement then causing the end 38 of the carrier 30 to contact the end 24 of the recess 18 and stop further movement. Hence, no tooth is needed for the fifth gear position.

It will be readily understood that the shift lever 76 can be moved in a clockwise direction to shift back from the fifth speed forward to neutral without interrupting the motion of the shift lever 76. At this time, the dog 70 of the pawl 64 will simply ride along the straight portion of the stop member 84 between the teeth 120 and 122 until the dog engages the tooth 120. At this time, the transmission will be shifted back to neutral. If it is desired to shift back into first foward speed, for example, the dog 68 will move onto the top of the tooth 122 with subsequent movement causing it to engage the tooth 124. Similarly, if it is desired to shift from neutral into reverse, the shift lever 76, after a slight reversal when reaching neutral, can be moved clockwise motion to cause the pawl 64 to similarly move, with the dog 70 moving onto the top of the tooth 120. Further movement of the lever then causes the end 40 of the carrier 30 to engage the end 26 of the recess 18 to stop the movement, at which time the ball 48 will be in the end one of the notches 46 with the shifting means 132 being in the reverse position. The shift lever 76 can be shifted back to neutral from reverse witout interruption of the movement but movement from neutral into first speed forward requires the slight reversal of the shift lever 76 to disengage the dog 68 or 70 of the pawl 54 from the respective tooth of the stop member 84.

Because the slight reversal off the shift lever 76 is required to shift to a further forward speed or from a forward speed to reverse, the shifting means 132 is entirely separate from the shift lever 76. The slight reversing movement of the shift lever, if tied directly to the shifter fork 134, would cause undesirable movement of the fork.

Referring to FIG. 1, a safety switch 146 is provided to prevent an engine associated with the vehicle on which the transmission 10 is employed from being started unless the transmission is in neutral. The switch 146 includes a pair of terminals 148 which are connected into an ignition circuit and render starting of the engine impossible unless the switch 146 is closed and the terminals 148 are electrically connected together. Within a chamber 150 in the switch 146 is an insulated carrier 152 having an electrically conducting strip 154 thereon. This electrically connects the terminals 148 when the carrier is moved inwardly by a plunger 156, the carrier and plunger being urged outwardly by a spring 158. The plunger 156 is moved inwardly to close the switch only when the transmission is in neutral, this being caused by a projection 160 on the end of the carrier 30 which is aligned with the plunger 156 when the transmission and carrier are in the neutral position. When the transmission is in any of the five forward speed gears, the carrier is spaced to one side of the plunger 156 and when the transmission and carrier 30 are in reverse, the plunger 156 extends into the notch 34. Hence, the switch 146 is closed only when the transmission is in neutral and the plunger 156 is depressed by the carrier projection 160.

Referring now to FIGS. 7–14, a modified shift mechanisms 162 is shown. This shift operates similarly to the shift of FIGS. 1–6 in that an interruption in the shifting motion or shift lever is required when shifting from neutral into reverse and when shifting from neutral up to the five forward speeds. However, this shift mechanism differs from that of FIGS. 1–6 in that the interruption required is only a momentary release of the shift lever rather than an actual slight reversal thereof.

An upper guide member 164 is located on the top of an upper portion of a transmission housing or can be an integral part of the housing if desired. The member 164 forms an arcuate recess or track 166 having a forward guide wall 168, a rear guide wall 170, and end walls 172 and 174. A carrier or block 176 is positioned in the recess 166 between the guide walls 168 and 170 and moves therealong in a curvilinear path. The carrier has a forward longitudinal edge 178 (see FIG. 8) positioned adjacent the forward wall 168 and has a rear longitudinal wall 180 positioned adjacent the rear wall 170 of the recess 166. The carrier also has squared ends 182 and 184. The carrier 176 further includes a cylindrical recess 186 opening at the edge 180 and containing a spring 188 which urges a ball 190 outwardly from the edge 180. The ball 186 is urged into any one of seven notches 192 formed in the guide wall 170, which seven notches correspond to five forward speeds, neutral, and reverse of the transmission. The carrier further has a central bore 194 extending therethrough and an annular recess 196 (also FIG. 9) around the bore, which recess contains a coil spring 198 having coils 200 in the annular recess and having end legs 202 and 204 extending outwardly through and beyond recessed areas 206 and 208 in the carrier.

Pawl means in the form of two pawls 210 and 212 have inner ends 214 and 216 pivotally mounted on the carrier 176 by a pin 218 (FIG. 9) extending through the bore 194. A pair of spring washers 220 are located between a head of the pin 218 and the carrier 176 to enable the pawls 210 and 212 to yield somewhat in a direction perpendicular to the planes in which they are disposed, with the spring washers also urging the pawls downwardly and in a direction transverse to the direction of movement of the shift lever 238. The pawls have curved outer edges 222 and 224 which bear against the guide wall 168 when urged outwardly by the spring legs 202 and 204 and have blunt ends 226 and 228. The pawls also have dogs or projections 230 and 232 to engage stop teeth, and projections 234 and 236 extending upwardly to pivot the pawls on the pin 218 when sufficient force is applied to the projections 234 and 236 to overcome the force of the spring legs 202 and 204.

A shift lever 238 has a horizontally extending portion 240 extending between the projections 234 and 236 and has a downwardly extending end 242 which is pivotally received in the housing of the transmission. Since the shift lever 238 need not be reversed when shifting, but only released temporarily, shifting means such as a shifter fork similar to the fork 134 can be connected directly to the downwardly extending end 242, within the transmission housing.

A stop member 244 limits the movement of the shift lever 238 in this instance, the stop member 244 being stationary. A forward edge of the stop member 244 facing toward the pawls 210 and 212 has a plurality of engageable teeth thereon. These include oppositely facing teeth 246 and 248 which correspond to the neutral position of the transmission and four additional teeth 250–256 facing in the same direction as the tooth 248. The four additional teeth correspond to first, second, third and fourth speed positions of the transmission. No teeth are needed for reverse and the fifth forward speed as will subsequently be apparent.

Support surfaces or extensions 258 (FIGS. 10 and 11) extend forwardly of each of the teeth 246–256 on the sides thereof toward the guide wall 170. Camming surfaces 260 which are substantially perpendicular to the support surfaces 258 extend at an angle to the guide wall so that the support surfaces 258 taper to nothing by the time they reach the next forward tooth, from a maximum thickness or width at the tip of the first tooth. Notches 262 are formed in front of the teeth 250–256 by the forward faces of the teeth, the camming surfaces 260, and the backs of the next adjacent teeth.

With the various components of the shift mechanism 176 being described, the operation thereof will be set forth. With the shift lever 238 in the central position of FIG. 7, and with the ball 190 in the fourth or central one of the notches 192, the transmission is in the second forward speed position. If the operator now desires to shift to the third forward speed, he moves the lever 238 in a counterclockwise direction, as viewed from above. As the lever so moves, the horizontally extending portion 240 thereof contacts the projection 234 of the pawl 210. Further movement of the lever causes the pawl 210 to pivot about the pin 218, with the carrier 176 remaining stationary because of the cooperation of the ball 190 and the notch 192. As the pawl 210 pivots in a counterclockwise direction, it moves along the support surface 258 (FIG. 14) and past the tooth 252, as shown in FIG. 12. With the surface 258 terminating beyond the tooth 252, the dog 230 then is moved into the notch 262 in front of the next tooth 254, as shown in FIGS. 13 and 15. By the time the dog 228 reaches the face of the tooth 254, the ball 190 will have moved into the next one of the notches 192 with the shift lever pivoting sufficiently to cause the shifting means to engage the gears in the transmission in the third forward speed. During this movement between the notches 192, the ball 190 moves along a serrated groove 264 between the notches 192. This causes a drag on the movement of the carrier 176 and assures that the lever 238 maintains force on the projection 234 to maintain the dog 210 in the down or counterclockwise position.

As soon as the lever 238 is released, the spring 198, and specifically the leg 202 thereof, pushes the pawl 210 back to the wall 168 and out of engagement with the tooth 254. As the dog 228 emerges from the notch 262, it moves on top of the support surface 258, being urged to that position primarily by the spring washers 220 located on the lower end of the pin 218. In this position, as shown in FIG. 7, the pawl remains until it is again pivoted by the shift lever 238. At this time, the pawl will not enter the same notch 262 because it is prevented from entering same by the surface 258. However, as the pawl moves beyond the tooth 254, it will enter the next notch 262 where there is no support surface at the beginning of the notch. The limits of movement of the shift lever 238 to the fifth forward speed and reverse positions are determined by the ends 182 and 184 of the carrier 176 engaging shoulders 266 and 268 (FIG. 7) of the recess 166.

In shifting from the fifth forward speed back to neutral, the pawl 212 is urged downwardly to the smooth section between the teeth 246 and 248. In shifting to reverse, the lever 238 is released to enable the pawl 212 to spring up onto the top of the support surface 258 extending in front of the tooth 246 so that it can then ride beyond the tooth 246 upon resumed pivotal movement of the shift lever 238.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. Mechanism for shifing a transmission comprising a movable shift lever, a pawl carrier movable in a path and having a plurality of positions corresponding in number to the number of in-gear and neutral positions of the transmission, means for guiding said pawl carrier in the path, pawl means movably mounted relative to said carrier and engageable by said shift lever for movement relative to said carrier, and a stop member for limiting continuous movement of said shift lever in one direction, which movement is sufficient to shift the transmission to the next position.

2. Mechanism according to claim 1 characterized by said shift lever being pivotally mounted in an upper wall of the transmission.

3. Mechanism according to claim 1 characterized by a shifter fork, and means connecting said shift fork with said carrier.

4. Mechanism according to claim 1 characterized by a shifter fork connected to said shift lever.

5. Mechanism according to claim 1 characterized by said stop member being spring loaded and urged toward a central position.

6. Mechanism according to claim 1 characterized by said stop member being stationary in a fixed position.

7. Mechanism according to claim 1 characterized by said pawl means having a pair of spaced dogs and being pivotally mounted on said carrier at a point equally spaced from said dogs.

8. Mechanism according to claim 1 characterized by said pawl means comprising two separately movable pawls pivotally mounted on said carrier at a common point.

9. Mechanism according to claim 1 characterized by resilient means for urging said pawl means in a direction away from said stop member.

10. Mechanism according to claim 1 characterized by said guide means and said carrier having ball and recess means for holding said carrier relative to said guide means in each of the plurality of positions of said carrier.

11. Mechanism according to claim 10 characterized by there being one ball and a plurality of recesses corresponding to the plurality of positions of said carrier.

12. Mechanism according to claim 1 characterized by said stop member having a plurality of teeth corresponding to certain positions of said transmission, said teeth being engaged by said pawl means to limit the movement of said pawl means and said shift lever.

13. Mechanism accordinng to claim 1 characterized by the predetermined path of said pawl carrier being a straight line.

14. Mechanism according to claim 1 characterized by the predetermined path of said pawl carrier being a curved line.

15. Mechanism for shifting a transmission having a housing, said mechanism comprising a pivotable shift lever carrier by the housing, a pawl carrier, means on the housing of the transmission for guiding said pawl carrier in a path, pawl means pivotally mounted on said carrier for pivotal movement relative to said carrier, the pivotal movement being effected by said shift lever movement, and a stop member engageable by said pawl means when pivotally moved for limiting the extend of continuous movement of said carrier, said pawl means, and said shift lever in one direction.

16. Mechanism according to claim 15 characterized by said shift lever being pivotally mounted in an upper wall of said transmission.

17. Mechanism according to claim 15 characterized by a shifter fork, and means connecting said shifter fork with said carrier.

18. Mechanism according to claim 15 characterized by said stop member being spring loaded and urged toward a central position.

19. Mechanism according to claim 15 characterized by said stop member being stationary and held in a fixed position.

20. Mechanism according to claim 15 characterized by said pawl means includes a pair of spaced dogs extending in opposite directions with said pawl means being pivotally connected to said carrier at a point equally spaced from both of said dogs.

21. Mechanism according to claim 15 characterized by said pawl means comprising two separate pawls each pivotally connected to said carrier.

22. Mechanism according to claim 21 characterized by each of said pawls having a projection engageable by said shift lever for pivotal movement relative to said carrier.

23. Mechanism according to claim 15 characterized by said pawl means being pivoted to said carrier by a pin, and resilient means acting on said pin to urge said pawl means in a direction transverse to the direction of pivotal movement of said shift lever.

24. Mechanism according to claim 15 characterized by said guide means and said carrier having detent means for holding said carrier relative to said guide means in each of a plurality of spaced positions of said carrier.

25. Mechanism according to claim 15 characterized by said stop member having a plurality of teeth corresponding to certain positions of said transmission, said teeth being engaged by said pawl means to limit the movement of said pawl means and said shift lever.

26. Mechanism according to claim 25 characterized by the number of teeth of said stop member being two less than the total number of positions, including neutral, of said transmission.

27. Mechanism according to claim 15 characterized by the predetermined path of said pawl carrier being a straight line.

28. Mechanism according to claim 15 characterized by the predetermined path of said pawl carrier being a curved line.

29. Mechanism for shifting a transmission comprising a movable shift lever, a pawl carrier movable in a path and having a plurality of positions corresponding in number to the number of in-gear and neutral positions of the transmission, means for guiding said pawl carrier in the path, pawl means movably mounted relative to said carrier engageable by said shift lever for movement relative to said carrier, said pawl means having two upwardly extending projections between which said shift lever extends, and a stop member for limiting continuous movement of said shift lever in one direction, which movement is sufficient to shift the transmission to the next position.

30. Mechanism for shifting a transmission comprising a pivotable shift lever, a pawl carrier, means for guiding said pawl carrier in a path, pawl means pivotally mounted on said carrier for pivotal movement relative to said carrier, said pawl means having two spaced, upwardly extending projections between which said shift lever extends, the pivotal movement being effected by said shift lever movement, and a stop member engageable by said pawl means when pivotally moved for limiting the extend of continuous movement of said carrier, said pawl means, and said shift lever in one direction.

* * * * *